United States Patent
Sung

[11] Patent Number: 5,872,726
[45] Date of Patent: Feb. 16, 1999

[54] MEMORY CONTROL APPARATUS FOR COMPRESSION AND EXPANSION OF DATA

[75] Inventor: Jae-seung Sung, Suwon, Rep. of Korea

[73] Assignee: Samsung Electronics Co., Ltd., Kyungki-Do, Rep. of Korea

[21] Appl. No.: 734,083

[22] Filed: Oct. 21, 1996

[30] Foreign Application Priority Data

Oct. 21, 1995 [KR] Rep. of Korea ................. 1995 36543

[51] Int. Cl.⁶ ............................ G06F 17/17; H03M 7/00; H04N 7/12
[52] U.S. Cl. ........................ 364/724.1; 341/61; 348/390; 348/439
[58] Field of Search .................................. 348/390, 439; 364/724.1; 341/61

[56] References Cited

U.S. PATENT DOCUMENTS

| | | | |
|---|---|---|---|
| 4,417,276 | 11/1983 | Bennett et al. | 348/390 |
| 4,460,890 | 7/1984 | Busby | 341/61 |
| 4,729,020 | 3/1988 | Schaphorst et al. | 348/419 |
| 5,111,417 | 5/1992 | Belloc et al. | 364/724.1 |
| 5,170,388 | 12/1992 | Endoh | 369/70 |
| 5,199,046 | 3/1993 | Ling | 375/222 |
| 5,313,303 | 5/1994 | Ersoz et al. | 348/439 |
| 5,408,673 | 4/1995 | Childers et al. | 364/231.9 |
| 5,621,404 | 4/1997 | Heiss et al. | 341/61 |
| 5,628,025 | 5/1997 | Chung et al. | 395/800.09 |
| 5,666,299 | 9/1997 | Adams et al. | 364/724.1 |

*Primary Examiner*—Paul R. Lintz
*Attorney, Agent, or Firm*—Sughrue, Mion, Zinn, Macpeak & Seas, PLLC

[57] ABSTRACT

A memory control apparatus for compression or expansion of data includes an input end for receiving a signal indicating the data rate of the original data and a second signal indicating the data rate of the target data, a first unit for generating an addressing control signal and a select control signal which vary a write or read address of the memory, in response to the first data rate and the second data rate, and a second unit for generating, in synchronization with the addressing control signal of said first unit, a write enable signal of the memory for controlling compression of the input data or a read enable signal of the memory for controlling expansion of the input data, according to the select control signal and first and second data rates. Thus, the input data can be freely compressed or expanded at any desired ratio.

5 Claims, 2 Drawing Sheets

MEMORY CONTROL APPARATUS FOR COMPRESSION AND EXPANSION OF DATA

BACKGROUND OF THE INVENTION

The present invention relates to a memory control apparatus for compression and/or expansion of data.

Generally, a write operation of data in a predetermined memory device is controlled to compress input data, and a read operation of data from the memory device is controlled to expand the compressed data into a desired ratio. An apparatus for generating a control signal to control a memory device in order to compress or expand data as described above can be implemented using a digital circuit. However, data can be usually compressed or expanded only with a fixed compression ratio or a fixed expansion ratio.

However, difference broadcasting systems have been employed in respective countries. With the advent of satellite broadcasting services, the standards of image pictures have been diversified. Receivers for displaying images have been diversified from cathode ray tubes (CRTs) to liquid crystal displays (LCDs). Thus, an apparatus for compressing or expanding images of various standards to be adapted in signal processing and image display of the receivers is needed, and demand for such apparatus is expected to increase.

SUMMARY OF THE INVENTION

To solve the above problem, it is an object of the present invention to provide a memory control apparatus for writing and reading data in and from the memory, respectively, to compress or expand input data at a desired ratio.

To accomplish the above object of the present invention, there is provided a memory control apparatus for compression or expansion of data comprising:

an input section for receiving a signal indicating the data rate of the original data and a second signal indicating the data rate of the target data;

first circuitry for generating an addressing control signal and a select control signal which vary a write or read address of the memory, in response to the first data rate and the second data rate; and second circuitry for generating, in synchronization with the addressing control signal a write enable signal for controlling compression of the input data, and a read enable signal for controlling expansion of the input data, according to the select control signal and first and second data rates.

BRIEF DESCRIPTION OF THE DRAWINGS

The preferred embodiments are described with reference to the drawings wherein.

DETAILED DESCRIPTION OF THE PREFERRED EMBODIMENT

A preferred embodiment of the present invention will be described below in more detail with reference to the accompanying drawings.

Figure 1:
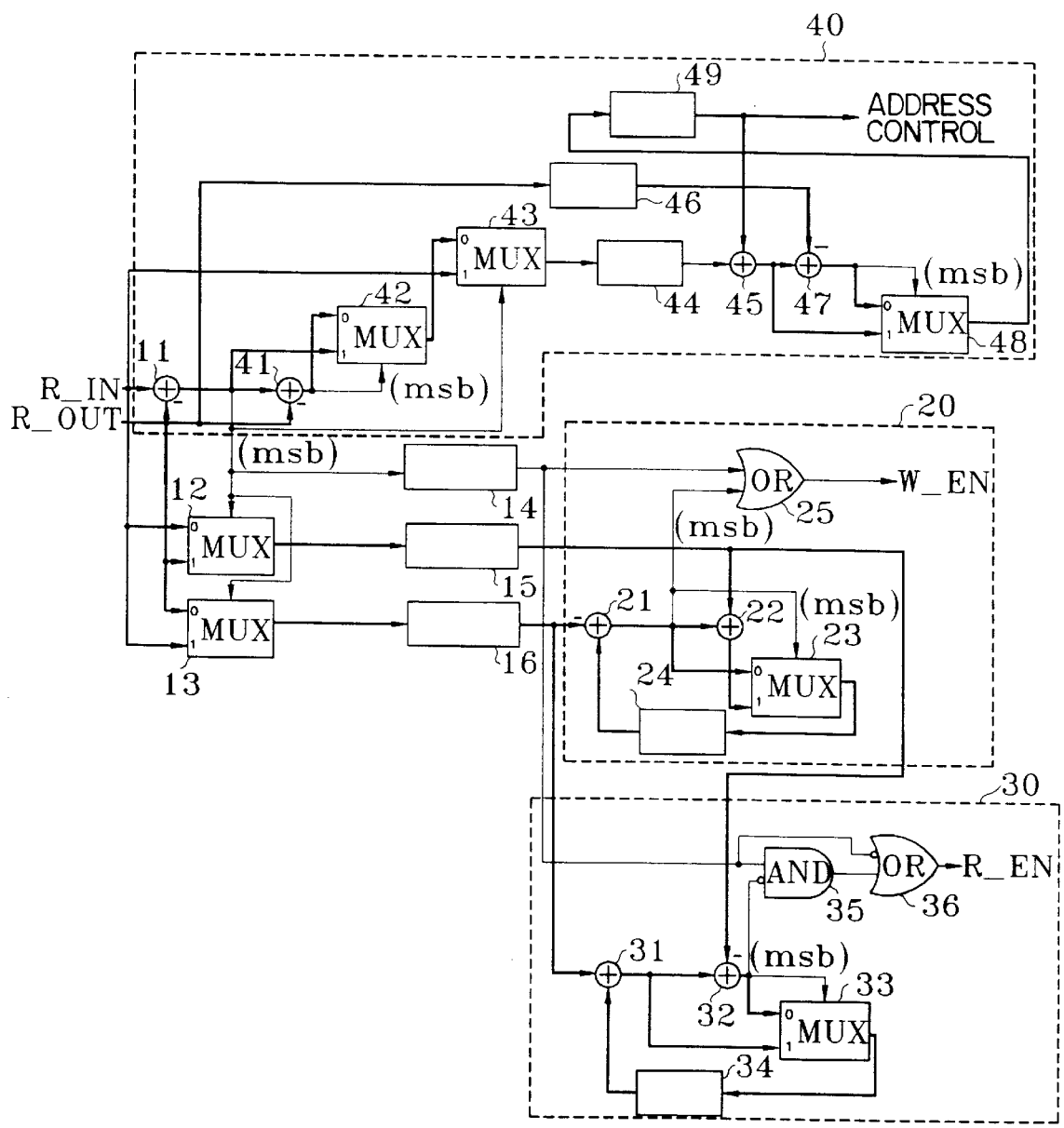
FIG. 1 is a block diagram of a memory control apparatus for compression and/or expansion of data according to a preferred embodiment of the present invention.

The FIG. 1 apparatus, showing a memory control apparatus for compression and/or expansion of data according to a preferred embodiment of the present invention, receives signals indicating the data rate R_IN of the original data to be compressed or expanded and data rate R_OUT of the target data. These data rates R_IN and R_OUT are predetermined based on the data rates of the original data and the compressed or expanded data. The data rate of the target data is a data rate of the compressed data when the data has been compressed, and that of the expanded data when the data has been expanded.

A first subtracter 11 subtracts the data rate R_OUT of the target data from the data rate R_IN of the original data. First and second multiplexers 12 and 13 selectively output one of the data rate R_IN of the original data and the data rate R_OUT of the target data according to a value of the most significant bit of the binary data output from the first subtracter 11. First through third latches 14 through 16 are connected to the first subtracter 11, and the first and second multiplexers 12 and 13, respectively, in order to latch the respective outputs thereof. A compression controller 20 for generating a write enable signal W_EN of the memory for compression of the original data and an expansion controller 30 for generating a read enable signal R_EN of the memory for expansion of the original data are connected to the first through third latches 14–16.

The compression controller 20 includes a second subtracter 21 for subtracting the output of the third latch 16 from the value fedback from the fourth latch 24, and a first adder 22 for adding the outputs of the second subtracter 21 and the second latch 15. The compression controller 20 also includes a third multiplexer 23 for selectively outputting one of the outputs of the second subtracter 21 and the first adder 22 according to the most significant bit of the binary data output from the second subtracter 21, and a fourth latch 24 for latching the output of the third multiplexer 23 and supplying the latched result to the second subtracter 21. The compression controller 20 also includes a first OR gate 25 for logically summing the most significant bit output from the second subtracter 21 and the output of the first latch 14 and generating a write enable signal W_EN.

Meanwhile, the expansion controller 30 includes a second adder 31 for adding the inputs fedback from the third latch 16 and a fifth latch 34, and a third subtracter 32 for subtracting the output of the second latch 15 from the output of the second adder 31. The expansion controller 30 also includes a fourth multiplexer 33 for selectively outputting one of the outputs of the second adder 31 and third subtracter 32 according to the most significant bit of the binary data output from the third subtracter 32, and a fifth latch 34 for latching the output of the fourth multiplexer 33 and supplying the latched result to the second adder 31. The expansion controller 30 also includes an AND gate 35 for logically multiplying the output of the first latch 14 by the inverted most significant bit input from the third subtracter 32, and a second OR gate 36 for logically summing the output from the AND gate 35 and the inverted output of the first latch 14 and generating a read enable signal R_EN.

Meanwhile, the FIG. 1 apparatus includes an addressing controller 40 for generating an addressing control signal in synchronization with the output of the compression controller 20 or the expansion controller 30. The addressing controller 40 includes the first subtracter 11 and a fourth subtracter 41 for subtracting the data rate R_OUT of the target data from the output of the first subtracter 11. The addressing controller 40 also includes a fifth multiplexer 42 for selectively outputting one of the outputs of the first subtracter 11 and the fourth subtracter 41 according to the most significant bit of the binary data output from the fourth subtracter 41, and a sixth multiplexer 42 for selectively outputting one of the output of the fifth multiplexer 42 and the data rate R_IN of the original data according to the most significant bit of the binary data output from the first subtracter 11. The addressing controller 40 also includes a sixth latch 44 for latching the output of the sixth multiplexer 43 and a third adder 45 for adding the output of the sixth latch 44 and a value of the previous addressing control signal being output from an eighth latch 49. A seventh latch 46 latches the data rate R_OUT of the target data and a fifth subtracter 47 subtracts the output of the seventh latch 46 from the output of the third adder 45. The addressing controller 40 also includes a seventh multiplexer 48 for selectively outputting one of the outputs of the third adder 45 and the fifth subtracter 47 according to the most significant bit of the binary data output from the fifth subtracter 47. An eighth latch 49 for latching the output of the seventh multiplexer 48 and generating the latched result as an addressing control signal is connected to the seventh multiplexer 48.

Figure 2:
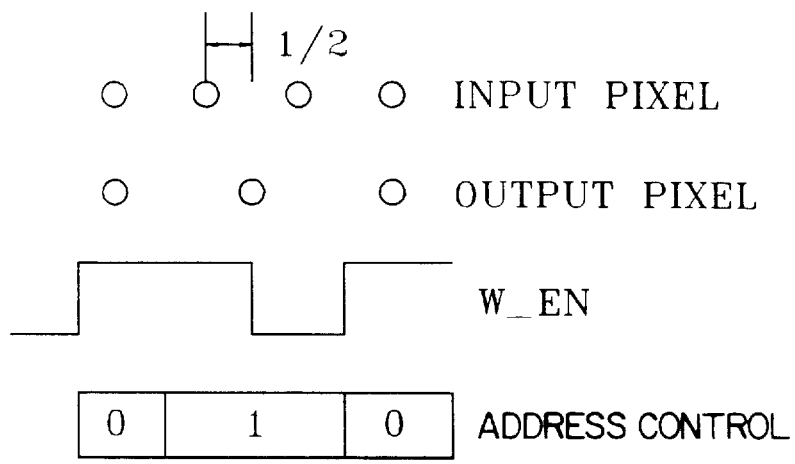
FIG. 2 shows a write enable signal and an addressing control signal which are generated in the FIG. 1 apparatus when the data is compressed at a ratio of 3 to 2.

Firstly, referring to FIG. 2, an example of compressing the input data at a predetermined ratio, for example, at a ratio of "3:2" will be described below.

In this embodiment, a signal indicating the data rate R_IN of original data, that is, "3" is input in one input section of the FIG. 1 apparatus, and a signal indicating the data rate R_OUT of the compressed data, that is, "2" is input in the other section thereof. The first subtracter 11 subtracts the data rate "2" of the target data from the data rate "3" of the original data, and outputs the subtraction result of "1." The most significant bit among the binary data output from the first subtracter 11 is supplied to the first and second multiplexers 12 and 13, and is used as a select control signal for selecting one of the data input to the multiplexers 12 and 13. Generally, the most significant bit of the binary data in the digital operation becomes a sign bit. As described above, since the output value of the first subtracter 11 is "1," the positive most significant bit, that is, "0" is supplied to the multiplexers 12 and 13. Then, the first multiplexer 12 selects the "3" input via the input end '0' and outputs the selected result, and the second multiplexer 13 selects and outputs the "2" input via the input end '0.' The second and third latches 15 and 16 latch the output values of the first and second multiplexers 12 and 13, respectively, and output the results to the compression controller 20 and expansion controller 30, respectively.

The second subtracter 21 of the compression controller 20 subtracts the output value "2" of the third latch 16 from the value fedback from the fourth latch 24. Here, since the fourth latch 24 outputs an initial value "0," the output value of the second subtracter 21 becomes "−2." Since the output of the second subtracter 21 is negative, the most significant bit third multiplexer 23 as a select control signal. The first OR gate 25 logically sums the "1" applied from the second subtracter 21 and "0" applied from the first latch 14 and generates a write enable signal W_EN whose value is "1."

The first adder 22 adds the output value "−2" of the second subtracter 21 and the output value "3" of the second latch 15 and outputs the added result "1" via an input end '1' of the third multiplexer 23. The third multiplexer 23 receives the most significant bit "1" as a select control signal from the second subtracter 21, and selects and outputs the out value "1" of the first adder 22 which is input via the input end '1.' The fourth latch 24 latches "1" output from the third multiplexer 23 and feeds back the latched result to the second subtracter 21. Then, the second subtracter 21 subtracts the output value "−2" of the third latch 16 from the fedback input value.

If the above loop is repeatedly performed, the output of the second subtracter 21 becomes "−1," "0," "−2," . . . . In this example, since the output of the first latch 14 becomes fixed as "0," the output of the first OR gate 25 is determined according to another input value, that is, the most significant bit of the binary data output from the second subtracter 21, independently of the output of the first latch 14. Thus, the sign bits "1," "1," "0," "1," . . . of the output of the second subtracter 21 are generated as the write enable signals W_EN.

As described above, during the time when the compression controller 20 generates the write enable signals W_EN, the addressing controller 40 generates an addressing control signal of the memory. In more detail, the fourth subtracter 41 subtracts the data rate R_OUT "2" of the target data from the output value "1" of the first subtracter 11 and outputs the subtracted result "−1." The most significant bit among the output of the fourth subtracter 14 is supplied to the fifth multiplexer 42 as a select control signal. Here, since the output of the fourth subtracter 41 is negative, the fifth multiplexer 42 receives the most significant bit "1" as a select control signal, and selects and outputs the output value "1" of the first subtracter 11 which is input via the input end '1.' The sixth multiplexer 43 receives the most significant bit among the output of the first subtracter 11 as a select control signal. That is, the sixth multiplexer 43 receives "0" as a select control signal, and selects and outputs the output value "1" of the fifth multiplexer 42 which is input via the input end '0.' The third adder 45 adds the output value "1" of the sixth multiplexer 43 via the sixth latch 44 and the initial value "0" input from the eighth latch 49 and outputs the result to the input end '1' of the seventh multiplexer 48. The fifth subtracter 47 subtracts the output value "2" of the seventh latch 46 from the output value "1" of the third adder 45, and outputs the result to the input end '0' of the seventh multiplexer 48. The seventh multiplexer 48 receives the most significant bit among the output of the fifth subtracter 47 as a select control signal. Since the output of the fifth subtracter 47 is negative, the value becomes "1." Thus, the seventh multiplexer 48 selects and outputs the output value "1" of the third adder 45 which is input via the input end '1.' The eighth latch 49 latches the output value of the seventh multiplexer 48 as the value of an addressing control signal. Table 1 represents the input values and output values of the seventh multiplexer 48 according to the repetitive loop operation of this example. That is, the value of the addressing control signal is represented in Table 1.

TABLE 1

| Input end '1' | Input end '0' | Select control signal | Output value |
|---|---|---|---|
| 0 | 0 | 0 | 0 |
| 1 | −1 | 1 | 1 |
| 2 | 0 | 0 | 0 |
| 1 | −1 | 1 | 1 |
| 2 | 0 | 0 | 0 |
| . | . | . | . |
| . | . | . | . |
| . | . | . | . |

As described above, the addressing controller 40 generates an addressing control signal in sequence with "0," "1," "0," "1" . . ." in synchronization with the write enable signal W_EN when the data is compressed at a ratio of "3:2."

Here, the value "1" of the addressing control signal means half of the interval between the two input data values. That is, if the second data is input during the time when the write enable signal W_EN is in the high level state after the initial input data is written in the memory, the input data is delayed by half of the interval of the input data and the delayed input data is written in the memory.

The write enable signal W_EN and the addressing control signal are generated from the compression controller 20 and the addressing controller 40, respectively, while the output value "0" of the first latch 14 is inverted and input to the second OR gate 36 of the expansion controller 30. Thus, the second OR gate 36 continuously generates "1" as the read enable signal R_EN, independently of the other input value, that is, the output value of the AND gate 35.

Figure 3:
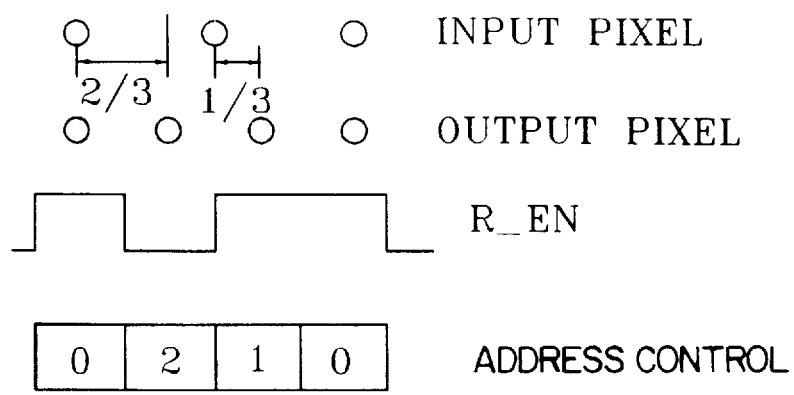
FIG. 3 shows a read enable signal and an addressing control signal which are generated in the FIG. 1 apparatus when data is expanded at a ratio of 2 to 3.

Next, referring to FIG. 3, an example of expanding the input data at a ratio of "2:3" will be described below.

When the input data is expanded at the "2:3" ration, the data rate R_IN of the original data "2" and the data rate R_OUT of the expanded data "3" are input. The first subtracter 11 subtracts the data rate "3" of the target data from the data rate "2" of the original data and outputs the result "−1." Since the output of the first subtracter 11 is negative, the multiplexers 12 and 13 output the "3" and "2" which are input via the input end '1,' respectively, and the second and third latches 15 and 16 latch the input values supplied from the multiplexers 12 and 13, respectively.

The second adder 31 of the expansion controller 30 adds "2" applied from the third latch 16 and the output of the fifth latch 34 to be fedback. Here, since the output value of the fifth latch 34 is an initial value of "0," the output of the second adder 31 becomes "2." The second adder 31 outputs the added result toward the input ends '1' of the fourth multiplexer 33, and to the third subtracter 32. The third subtracter 32 subtracts the output of the second latch 15 from the output of the second adder 31. The third subtracter 32 outputs the subtracted result "−1" to the input end '0' of the fourth multiplexer 33, and supplies the most significant bit "1" to the AND gate 35 and the fourth multiplexer 33 as a select control signal, respectively. The AND gate 35 receives the inverted most significant bit from the third subtracter 32 and logically multiples the received value by the output value "1" of the first latch 14. The output of the AND gate 35 becomes "0" because of the inverted input from the third subtracter 32. The second OR gate 36 logically sums the output of the AND gate 35 and the inverted output of the first latch 14. The second OR gate 36 generates the result of the operation as the read enable signal R_EN.

The fourth multiplexer 33 selects and outputs the output "2" of the second adder 31 which is input via the input end '1,' according to the select control signal of "1." The output of the fourth multiplexer 33 is fedback to the second adder 31 via the fifth latch 34. Table 2 represents the input and output values of the fourth multiplexer 33.

TABLE 2

| Input end '1' | Input end '0' | Select control signal | Output value |
|---|---|---|---|
| 0 | 0 | 0 | 0 |
| 2 | −1 | 1 | 2 |
| 4 | 1 | 0 | 1 |
| 3 | 0 | 0 | 0 |
| 2 | −1 | 1 | 2 |
| . | . | . | . |
| . | . | . | . |
| . | . | . | . |

Since the same select control signal as that applied to the fourth multiplexer 33 is applied to the AND gate 35, the read enable signal R_EN is generated as "1," "0," "1," "1" . . . by the AND gate 35 and the second OR gate 36.

Here, the principle of an operation for generating an addressing control signal is same as in the above-described compression operation, the detailed description thereof will therefore be omitted. The results are as follows. Table 3 represents the input and output values of the seventh multiplexer 48 for generating a final addressing control signal.

TABLE 3

| Input end '1' | Input end '0' | Select control signal | Output value |
|---|---|---|---|
| 0 | 0 | 0 | 0 |
| 2 | −1 | 1 | 2 |
| 4 | 1 | 0 | 1 |
| 3 | 0 | 0 | 0 |
| 2 | −1 | 1 | 2 |
| . | . | . | . |
| . | . | . | . |
| . | . | . | . |

That is, when addressing controller 40 expands the data at a ratio of "2:3," the addressing controller 40 generates the addressing control signal "0," "2," "1," "0" . . . in synchronization with the read enable signal R_EN generated in the expansion controller 30. The value of "1" among the values of the addressing control signal means one third of the interval between the two input data. Thus, as shown in FIG. 3, the data written in the memory is read out according to the addressing control signal. During the time when the read enable signal R_EN and the address value are generated from the expansion controller 30 and the addressing controller 40 as described above, respectively, the output value "1" of the first latch 14 is continuously input to the first OR gate 25 of the compression controller 20. Thus, the second OR gate 25 continuously generates "1" as the write enable signal W_EN independently of the other input value.

As described above, the memory control apparatus for compression and/or expansion of data can adaptively generate memory write and read enable signals according to a compression ratio and an expansion ratio, as well as an addressing control signal in synchronization with the write and read enable signals. Thus, data can be freely compressed or expanded at any desired ratio.

While only certain embodiments of the invention have been specifically described herein, it will apparent that numerous modifications may be made thereto without departing from the spirit and scope of the invention.

What is claimed is:

1. A memory control apparatus for compression or expansion of data comprising:

an input end for receiving a first signal indicating a first data rate of original data and a second signal indicating a second data rate of target data;

a select control signal circuitry generating a select control signal;

an addressing control signal generator which varies a write and read address control signal in response to the first data rate and the second data rate;

wherein said addressing control signal generator comprises:

a first subtracter for subtracting the second data rate from the first data rate;

a second subtracter for subtracting the second data rate from the output of said first subtracter;

a first multiplexer for selectively outputting one of the outputs of said first and second subtracters according to the most significant bit of the binary data output from said second subtracter;

a second multiplexer for selectively outputting one of the first data rate and the output of said first multiplexer according to the most significant bit of the binary data output from said first subtracter;

a first adder for adding the output of said second multiplexer and the value of a prior addressing control signal;

a third subtracter for subtracting the second data rate from the output of said first adder; and a third multiplexer for selectively outputting one of the outputs of said first adder and said third subtracter as a current value of the addressing control signal according to the most significant bit of the binary data output from said third subtracter; and a read/write enable generator responsive to said select control signal to generate, in synchronization with the addressing control signal generator, one of a write enable signal for controlling compression of the input data and a read enable signal for controlling expansion of the input data, according to the select control signal and the first and second data rates.

2. The memory control apparatus according to claim 1, wherein said read/write enable generator comprises:

an output determiner outputting the larger of the first and second data rates as a first output and the smaller of the first and second data rates as a second output, in response to the select control signal;

a compression controller including a first input end and a second input end for receiving the first output and the second output of said output determiner, respectively, and for generating the write enable signal according to the value of the select control signal, the first output and the second output; and an expansion controller including a third input end and a fourth input end for receiving the first output and the second output of said output determiner, respectively, and for generating the read enable signal according to the value of the select control signal, the first output and the second output.

3. The memory control apparatus according to claim 2, wherein said output determiner comprises:

a fourth multiplexer for selectively outputting one of the first data rate and the second data rate as the first output according to the most significant bit of the binary data output from said first subtracter; and a fifth multiplexer for selectively outputting the other one of the first data rate and the second data rate as the second output according to the most significant bit of the binary data output from said first subtracter.

4. The memory control apparatus according to claim 3, wherein said compression controller comprises:

a fourth subtracter for subtracting the second output of said fifth multiplexer from binary data applied to first input end of the fourth subtracter;

a second adder for adding the output of said fourth subtracter and the first output of said fourth multiplexer;

a sixth multiplexer for selecting one of the outputs of said fourth subtracter and said second adder, and supplying the selected data to the first input end of said fourth subtracter, according to the most significant bit output of said fourth subtracter; and an OR gate for logically summing the most significant bit output of said first subtracter and the most significant bit output of said fourth subtracter, and outputting the result as the write enable signal.

5. The memory control apparatus according to claim 3, wherein said expansion controller comprises:

a second adder for adding binary data applied to first input end of the second adder, and the second output of said fifth multiplexer;

a fourth subtracter for subtracting the first output of said fourth multiplexer from the output of said second adder;

a sixth multiplexer for selecting one of the outputs of said fourth subtracter and second adder, and supplying the selected data to the first input end of said second adder;

an AND gate for logically multiplying the most significant bit output of said first subtracter by the inverted most significant bit of the output of said fourth subtracter; and an OR gate for logically summing the inverted most significant bit of the output of said first subtracter and the output of said AND gate.

* * * * *